US009282307B2

(12) United States Patent
Lahr et al.

(10) Patent No.: US 9,282,307 B2
(45) Date of Patent: Mar. 8, 2016

(54) SYSTEM AND METHODS FOR SEARCHING AND DISPLAYING ONTOLOGY-BASED DATA STRUCTURES

(75) Inventors: Nils B. Lahr, Redmond, WA (US); Garrick C. Barr, Woodinville, WA (US)

(73) Assignee: SYNERGY SPORTS TECHNOLOGY, LLC, Tempe, AZ (US)

( * ) Notice: Subject to any disclaimer, the term of this patent is extended or adjusted under 35 U.S.C. 154(b) by 299 days.

(21) Appl. No.: 13/085,326

(22) Filed: Apr. 12, 2011

(65) Prior Publication Data
US 2011/0264680 A1 Oct. 27, 2011

Related U.S. Application Data

(60) Provisional application No. 61/323,790, filed on Apr. 13, 2010, provisional application No. 61/323,800, filed on Apr. 13, 2010.

(51) Int. Cl.
*G06F 7/00* (2006.01)
*G06F 17/30* (2006.01)
*H04N 9/87* (2006.01)
*H04N 5/765* (2006.01)
*H04N 21/433* (2011.01)
*H04N 21/442* (2011.01)

(52) U.S. Cl.
CPC ............. *H04N 9/87* (2013.01); *H04N 5/765* (2013.01); *H04N 21/4331* (2013.01); *H04N 21/44222* (2013.01)

(58) Field of Classification Search
CPC .......... G06F 17/30707; G06F 17/2785; G06F 17/30554; G06F 17/30696; Y10S 707/99933
See application file for complete search history.

(56) References Cited

U.S. PATENT DOCUMENTS

| 7,987,176 B2* | 7/2011 | Latzina ............... G06F 17/2785 704/9 |
| 2001/0034734 A1* | 10/2001 | Whitley ................. G06Q 10/06 |
| 2004/0078236 A1* | 4/2004 | Stoodley ............... G06F 19/322 705/2 |
| 2004/0162803 A1* | 8/2004 | Rhoads .................. G06Q 10/10 |
| 2008/0082512 A1* | 4/2008 | Hogan ............. G06F 17/30864 |
| 2010/0114855 A1* | 5/2010 | Li et al. ......................... 707/708 |
| 2011/0055188 A1* | 3/2011 | Gras ................. G06F 17/30528 707/706 |
| 2011/0237317 A1* | 9/2011 | Noonan .................. A63F 13/12 463/2 |
| 2012/0221560 A1* | 8/2012 | Chevalier ............ G06F 17/3089 707/723 |

OTHER PUBLICATIONS

"Philadelphia—Eagles—Statistics—NFL—Yahoo! Sport", 2009.*
"Philadelphia—Eagles—Statistics—NFL—Yahoo!Sport", 2009.*

* cited by examiner

*Primary Examiner* — Binh V Ho
(74) *Attorney, Agent, or Firm* — Foster Pepper PLLC; Richard T. Black; P. G. Scott Born

(57) ABSTRACT

Systems and methods that for searching and displaying ontology-based data structures so that the essential and relevant qualities of searched subject matters may be categorized by subject indices. The system and methods described below utilize ontology-based data systems to enable a more integrated and tighter search experience while at the same time providing a natural search experience.

9 Claims, 4 Drawing Sheets

Sheldon Williams—All Games

| Plays | % Time | Number | PPP | Rank | FG% | %TO |
|---|---|---|---|---|---|---|
| Total Plays | 100% | 535 | 1.05 | 89% | 46.6% | 13.3% |
| P&R Ball Handler | 19% | 101 | 1.08 | 95% | 50.9% | 16.8% |
| Spot-Up | 19% | 100 | 1.4 | 99% | 51.1% | 4.0% |
| Isolation | 17% | 90 | 0.86 | 59% | 36.5% | 11.1% |
| Transition | 16% | 87 | 1.13 | 47% | 49.2% | 12.6% |
| Post-Up | 9% | 48 | 0.65 | 19% | 33.3% | 12.5% |
| Off Screen | 5% | 29 | 1.41 | 98% | 56.0% | 10.3% |
| Cut | 4% | 22 | 1.5 | 92% | 75.0% | 4.6% |
| Hand-Off | 4% | 20 | 1.2 | 95% | 46.7% | 5.0% |
| P&R Roll Man | 2% | 9 | 1.22 | - | 40.0% | 11.1% |
| Put Backs | 1% | 6 | 1 | - | 40.0% | 0.0% |
| Miscellaneous | 4% | 23 | 0.46 | 58% | - | 73.9% |

*Fig. 3*

Sheldon Williams—All Games

| 2009-10 (34 Games) | Min | Reb | STL | TO | PPP | Pts |
|---|---|---|---|---|---|---|
| Full Season | | | | | | |
| @ TOR | | | | | | |
| ATL | | | | | | |
| @ MIN | | | | | | |
| CHI | | | | | | |
| DAL | | | | | | |
| @ TOR | | | | | | |
| ATL | | | | | | |
| @ MIN | | | | | | |
| CHI | | | | | | |
| DAL | | | | | | |
| LAL | | | | | | |

*Fig. 4*

SYSTEM AND METHODS FOR SEARCHING AND DISPLAYING ONTOLOGY-BASED DATA STRUCTURES

CROSS REFERENCE TO RELATED APPLICATIONS

This application claims the benefit of priority to and incorporates by reference in their entirety U.S. Provisional Patent Application No. 61/323,790 filed Apr. 13, 2010 and to U.S. Provisional Patent Application No. 61/323,800 filed Apr. 13, 2010. All applications herein incorporated by reference in their entirety.

FIELD OF THE INVENTION

Disclosure herein is generally directed to the field of ontology concerned with the hierarchical structuring of knowledge about subject matters by subcategorizing them according to their essential or relevant qualities.

BACKGROUND OF THE INVENTION

Google® has demonstrated that searching for information about any subject is most natural and convenient when you are allowed to simply type what you are looking for into a single input box. Prior attempts at searching the Internet for specific information included an attempt to create comprehensive categories with the user making selections from the top level category down. In Google®, typing "Shaquille O'Neil Boston Game Last Night" produces links to other websites such as ESPN.com or NBA.com where the user must then drill down using those websites' navigation systems to locate Shaq's stats for the game in question together with possibly pre-produced generic highlight video of the game in question. With ESPN.com and NBA.com, the user must navigate to O'Neil's personal page and/or the game he may have played the previous night. Each navigation attempt requires several mouse clicks and significant user interaction while reading the individual website's navigation systems. This level of interaction is excessive for topics and situations that can be handled in a more efficient and convenient way. A sports fan has a good idea of the content he/she wants to investigate, yet there are no easy search tools to allow him/her to get corresponding statistical and other contextual results (such as video links). Efforts to do so result in major compromises, moving the experience away from what feels natural and easy. With existing systems of search, fans can have difficulty pinpointing the content they want to find and will therefore reduce frustration by engaging in fewer searches than if a more convenient method was available. Users need a system that enables them to "follow their nose" as regards their unique ideas on the statistics they want to investigate. Their only alternative is to use slow and inconvenient search methods to navigate to basic standard tables and basic short highlight video reels provided by today's Internet resources.

There are no known solutions to this problem. When a user enters "Boston Celtics" into a search box, links are provided to websites that may or may not contain the information the user is looking for. They might be directed to a selection of team web pages for the Celtics and if users want to see video of a specific situation, their only choices are to navigate to generic highlight video reels or to spend a great deal of time scanning full-game video on demand (VOD) streaming to find what they want. If the user is interested in detailed information on narrow search topic such as Paul Pierce versus Kobe Bryant in last night's game and how they compared statistically together with only video clips showing the two men playing against each other, users may be able to find what they want after a great deal of time and effort. The ultimate results will be diffuse and very likely unsatisfactory, however. Currently employed solutions require direct intervention on the search engine side and are gross attempts at satisfying the deep search desires of fans wanting to obtain more specific information relating to their current interests when conducting sports-related searches.

Existing search engines impose requirements on users to conceive their own search terms. Using the fabricated search terms, the search system's back-end attempts to map these criteria into a systematic ontological-style search to produce appropriate specific targeted responses. It is not currently possible to engage in an ontological search, as that would require both the user and the system to reach consensus within the tremendous depth and scope of the English language as to the relevance and importance of the current search and how also to optimally utilize all available variations to produce desired results.

Furthermore, current search engine processes are severely limited by its "single query step" nature. The user enters a single string of words hoping to obtain results they have in mind and the search system might provide some type-ahead options to select from (if desired). When the user hits enter on their submitted word string or selects a type-ahead option, they are provided a list of possible websites that could match their needs. The user selects one of the web sites to see if there is anything of interest. Each returned web site contains a limited set of data that may or may not address the needs of the investigation in progress. Typically, the user must navigate to several websites to grow the data set, but since the data exist in several different locations, the process is ad hoc at best. The user does have the option to revise search criteria, however, but even if the new search provides better website link options, the user still faces the challenge of accessing several sites and must also use some means to aggregate data from the various sites to address their specific needs.

BRIEF DESCRIPTION OF THE DRAWINGS

Preferred and alternative examples of the present invention are described in detail below with reference to the following drawings:

FIG. 3 depicts a third screen shot listing "All Games Statistics" for Sheldon Williams by a first category set; and FIG. 4 a fourth screen shot listing "All Games Statistics" for Sheldon Williams by a second category set.

DETAILED DESCRIPTION OF THE PARTICULAR EMBODIMENTS

Figure 1:
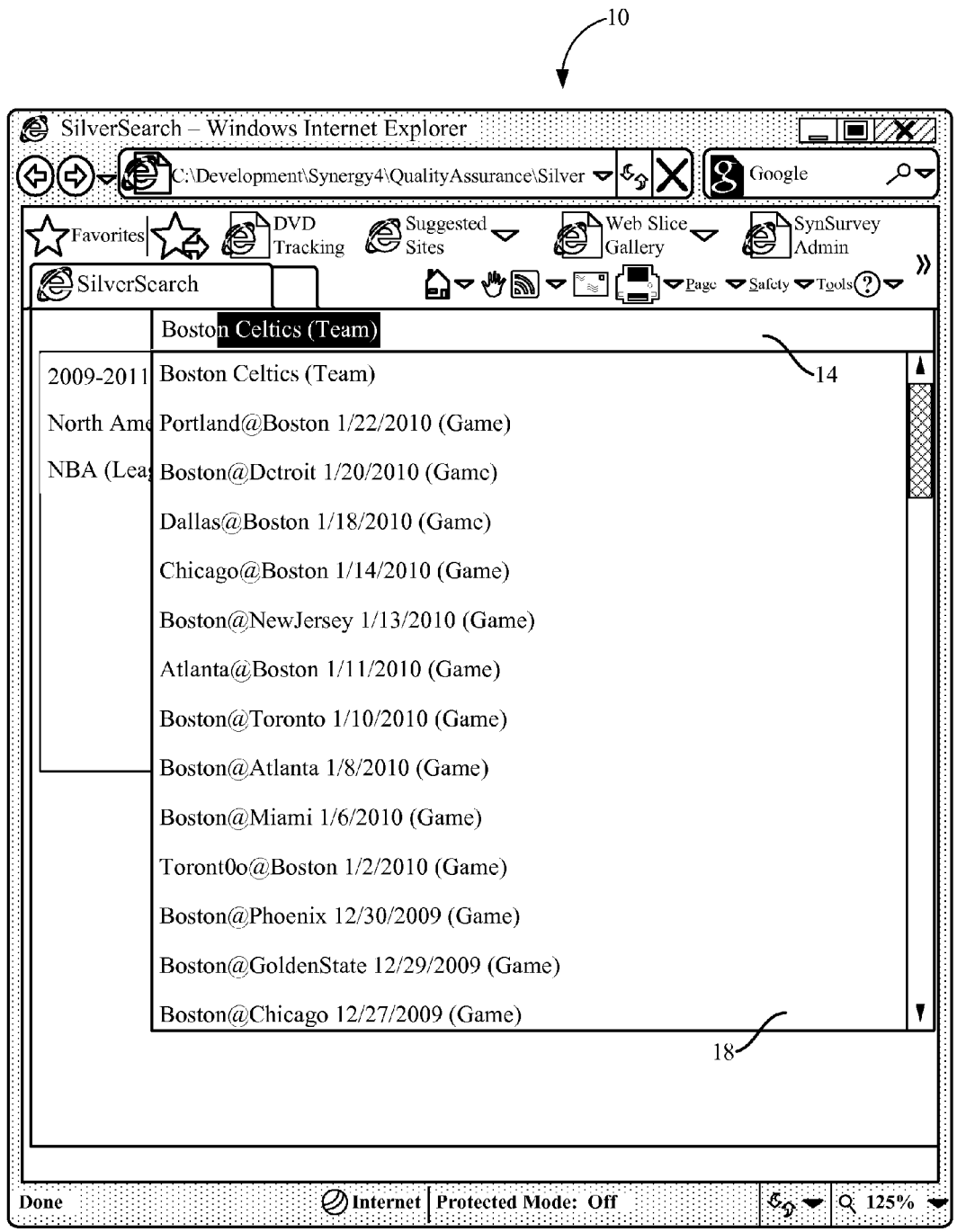
FIG. 1 depicts a first screen shot having subject matter searches arranged in an ontological relationship and providing the search to engage in multiple query inputs having different criteria that are editable by the user in real time.

Embodiments described in herein concern relational systems and methods to generate search results of a user-specified investigation utilizing ontology based search relationships of the terms contained within the user-specified investigation. The ontological based searching method provides for browser-based searching in local and remote databases available on local or Internet networks within a set of data having a well-defined, pre-determined relationship structure. Such well-defined, pre-determined structure includes sports-based and other subject matters.

In general the particular embodiments of the invention provide for a computer executable program having instructions to implement a method to conduct an ontological subject matter search by selecting a subject matter for searching by at least one high-level criterion and defining an ontology structure for the at least one high-level criterion for the selected subject matter. Thereafter, the criteria for the ontological subject matter may be revised in real time. In other particular embodiments the ontology structure relates to sports-based data.

Embodiments for displaying ontology-based data structures provide for systems and methods that correlates the available data from the search results via ontology-directed search relationships. This correlation makes browser-based viewing more efficient to the user in getting the desired results faster and with improved accuracy.

The embodiments provide for searching and displaying ontology-based data structures so that the essential and relevant qualities of searched subject matters may be categorized by subject indices. The system and methods described below utilizing the ontology-based data systems enable a more integrated and tighter search experience while at the same time providing a natural search experience (similar to the search experience users have come to expect from search engines such as Google® for static searches on less time sensitive and dynamic topics). There are no search methods available, beyond website links and each website's distinct navigational systems, to conveniently and quickly allow users to "follow their nose" or to intuitively locate dynamic statistics based on a large set of available criteria.

In accordance with the particular embodiments herein, there is provided a set of data arranged with tight relationships between various subset data groupings. Additionally, there is a well-defined ontology structure which maps such data to correspond with real world situations. The attached examples address basketball, but the invention is not limited to a single sport or even to sports alone. Other topics can benefit from the invention. The process adds substantial value to users via organization of, and ease of access to, the data. The invention provides a relational data system which correlates all available data via ontology-directed available search relationships and connects results to a set of generalized statistical data views with applicable stats for the user's specific investigation which may also contain contextual information such as links to applicable video edits.

The particular embodiments provide for that when searching for information relating to the National Basketball Association, the client is presented with a Google®-style search box. Users type in highest-level data, such as a team name, a player name or a specific game. The system provides type-ahead options from which to select, and once selected, the selection forms the primary search basis and is displayed on screen as such. Once the initial selection is made, the user is subsequently presented with the system's next available search criteria options based on the initially set criterion. After selecting the second search criterion, that criterion is added to the on-screen search criteria list and the user can then select a third option from yet another list of selections. That element is also added to the on-screen search criteria list and another set of relevant options based on prior selections may appear if more potentially useful relationships are defined within the system's ontology. By presenting the relationships making up the query string, the user can easily navigate though a set of relevant data views to obtain desired results and can also click on any linkable items within the data view (such as "assists" in order to see matching video streamed to their computer).

Furthermore, the particular embodiments provides for a system that presents the client with type-ahead options, and after one option is selected, new options—which are logical "next steps"—are made available to build a multi-step query. New options are filtered in context with previous selections and in accordance with the system's ontology structure and data that is currently available. Additionally, as soon as is reasonable, the search will not only present type-ahead options to help guide searches, but will also provide statistical data views and other contextual data pertaining to already selected indices. For example, a user could type "Boston" and the type-ahead might display 1) a list of all Boston games 2) the Boston team as a whole and 3) a list of the currently active Boston players. This initial presentation is generated by the search relationship system. If the user next selects a specific game, then options occurring within that game, such as a list of Boston's players who played in the specified game, team offensive categories, team defensive categories or mirrored options related to the opposing team would be available from which to choose. When the next selection is made, such as choosing a specific player, the resulting search criteria options would be based (as in all cases) on the system's ontology for Basketball, meaning that if a game and player are selected, the system would identify what other "legal" relationships exist in the topic "basketball" combined with the available statistics for that user's permissions. Adjoining statistical tables would instantly display interesting data pertaining to the selected player within the selected game. As further drill-down criteria are selected, the adjoining table's statistics change to match the new, more narrowly focused query to provide up-to-date relevant information for that stage in the query process. The entire process benefits from a "data-driven" approach where the data is constantly made available and serves to guide the user's query as it is being constructed.

FIG. 1 depicts a browser screen shot 10 having subject matter searches arranged in an ontological relationship and providing the search to engage in multiple query inputs having different criteria that are editable by the user in real time. In query search box or input field 14, as the user types "Bosto", the type-ahead feature completes the input field 14 with "n Celtics (Team) highlighted in black. A drop down panel 18 contains a series of ontologically relevant listings of team location vs. team location by date listings that are related to the Boston Celtics (Team).

Figure 2:
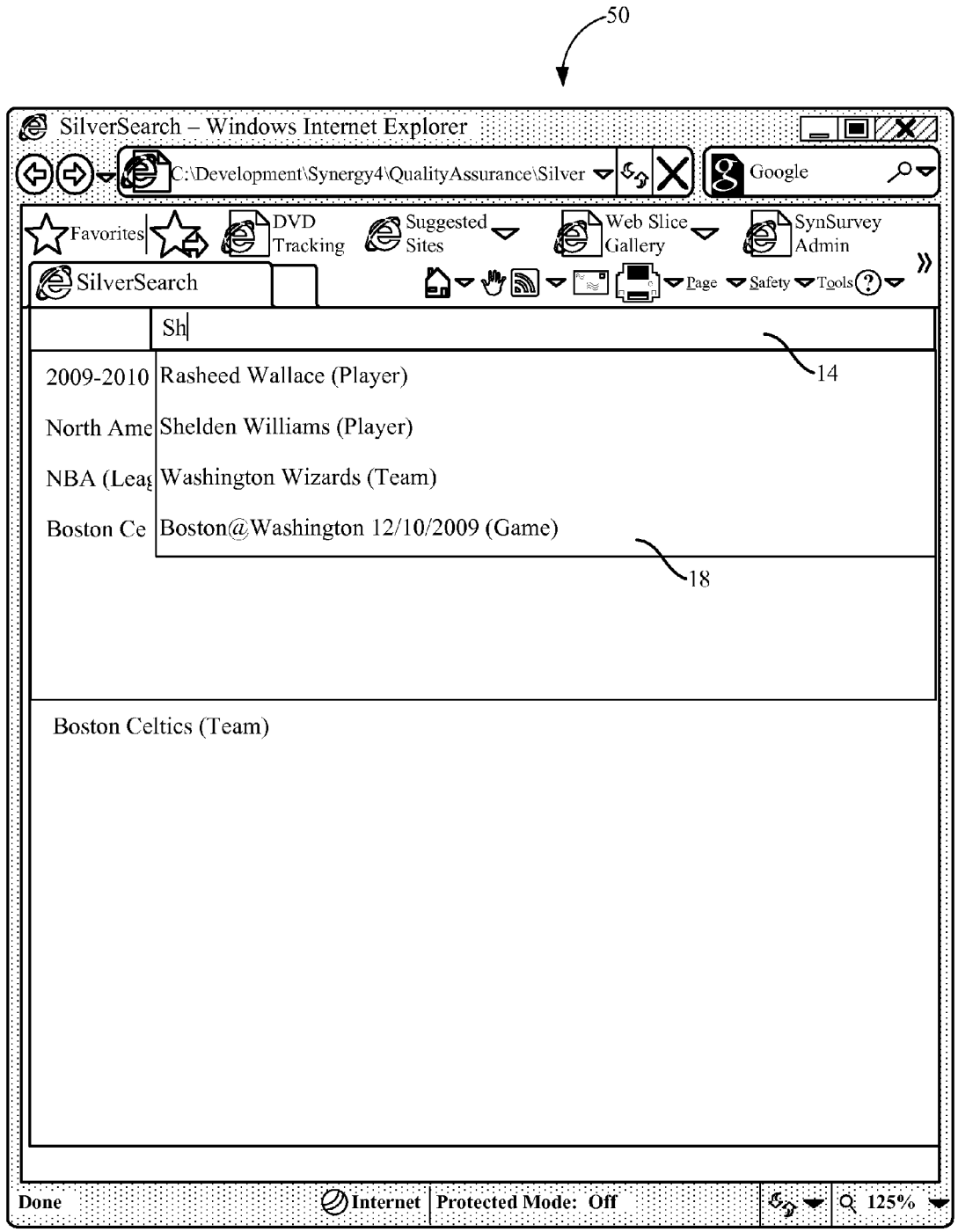
FIG. 2 depicts a second screen shot of results of a focused criteria having a narrowed ontology to a specific player named "Sheldon Williams"

FIG. 2 depicts a browser screen shot 50 of results of a focused criterion having a narrowed ontology to a specific player named "Sheldon Williams". The subject matter for "Sheldon Williams" is being actively typed by the searcher, as indicated by the letters "Sh" being typed into the input field 14. In this embodiment, the ontological-based results are displayed in the drop down panel 18 while "Sh" is being typed. Ontologically related subject matters include Rasheed Wallace (Player), Sheldon Williams (Player), Washington Wizards (Team), and Boston@Washington Dec. 10, 2009 (Game).

FIG. 3 depicts a portion of a browser screen shot 100 having a table 114 listing "All Games Statistics" for ontologically narrowed "Sheldon Williams" subject matter by a first category set displayed in a plays table 114. Connected with the plays table 114 are Plays tab 122 and Stats tab 126. In screen shot 100 the Plays tab 122 is active. The first category set include results listed for Plays by % time, number, PPP, rank, FG %, and % TO. The "Plays" are further sub-categorized by Total Plays, P & R Ball Handler, Spot-Up, Isolation, Transition, Post-Up, Off Screen, Cut, Hand-Off, P & R Roll Man, Put Backs, and Miscellaneous.

FIG. 4 depicts another portion of a browser screen shot 150 in which the Stats tab 126 is active to reveal a stats table 164. In the stats table 164 an "All Games Statistics" for is ontologically narrowed to "Sheldon Williams" subject matter by a second category set. The second category set include results listed for season 2009-10 by Min, Reb, STL, TO, PPP, and Pts. Data by full season, @TOR for "at Toronto", ATL for "Atlanta", and similarly for MIN (Minnesota), CHI (Chicago), and DAL (Dallas).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A non-transitory computer-readable medium having instructions, that when executed by a processing device, enable the processing device to implement a method, the method comprising:
   displaying in a graphical user interface (GUI) on a display device an alphanumeric expression;
   generating to the GUI a first data-entry field;
   receiving in the first field partial first search term;
   in response to receiving the partial first search term, generating to the GUI a first drop-down menu listing a first set of predetermined items ontologically related to the first alphanumeric expression;
   wherein the first search term comprises an identifier of a sports team;
   receiving a selection of a first item of the first set of items;
   generating to the GUI a second data-entry field;
   receiving in the second field a partial second search term;
   in response to receiving the partial second search term, generating to the GUI a second drop-down menu listing a second set of predetermined items ontologically related to the selected first item;
   wherein the second set of items comprises identifiers of games played by the sports team;
   receiving the selection of a second item of the second set of items; and
   in response to receiving a selection of a second item of the second set of items, generating to the display device a graphic element displaying statistics based on the selected first and second items.

2. The medium of claim 1, wherein the second set of items comprises players who played in the game identified by the selected first item.

3. The medium of claim 1, wherein the first search term comprises an identifier of an athlete.

4. The medium of claim 3, wherein the second set of items comprises identifiers of games played by the selected athlete.

5. The medium of claim 3, wherein the second set of items comprises statistical categories associated with the game of the selected identifier.

6. A non-transitory computer-readable medium having instructions, that when executed by a processing device, enable the processing device to implement a method, the method comprising:
   displaying in a graphical user interface (GUI) on a display device an alphanumeric expression;
   generating to the GUI a first data-entry field;
   receiving in the first field partial first search term;
   in response to receiving the partial first search term, generating to the GUI a first drop-down menu listing a first set of predetermined items ontologically related to the first alphanumeric expression;
   wherein the first search term comprises an identifier of an athlete;
   receiving a selection of a first item of the first set of items;
   generating to the GUI a second data-entry field;
   receiving in the second field a partial second search term;
   in response to receiving the partial second search term, generating to the GUI a second drop-down menu listing a second set of predetermined items ontologically related to the selected first item;
   wherein the second set of items comprises identifiers of games played by the selected athlete;
   receiving the selection of a second item of the second set of items; and
   in response to receiving a selection of a second item of the second set of items, generating to the display device a graphic element displaying statistics based on the selected first and second items.

7. The medium of claim 6, wherein the first search term comprises an identifier of a sports team.

8. The medium of claim 7, wherein the second set of items comprises identifiers of games played by the sports team.

9. The medium of claim 7, wherein the second set of items comprises players who played in the game identified by the selected first item.

* * * * *